Sept. 29, 1964 R. ELSEN 3,150,438
MULTI-STEP PRESS
Filed Aug. 22, 1960 10 Sheets-Sheet 1

Inventor:
Reinhold Elsen
by

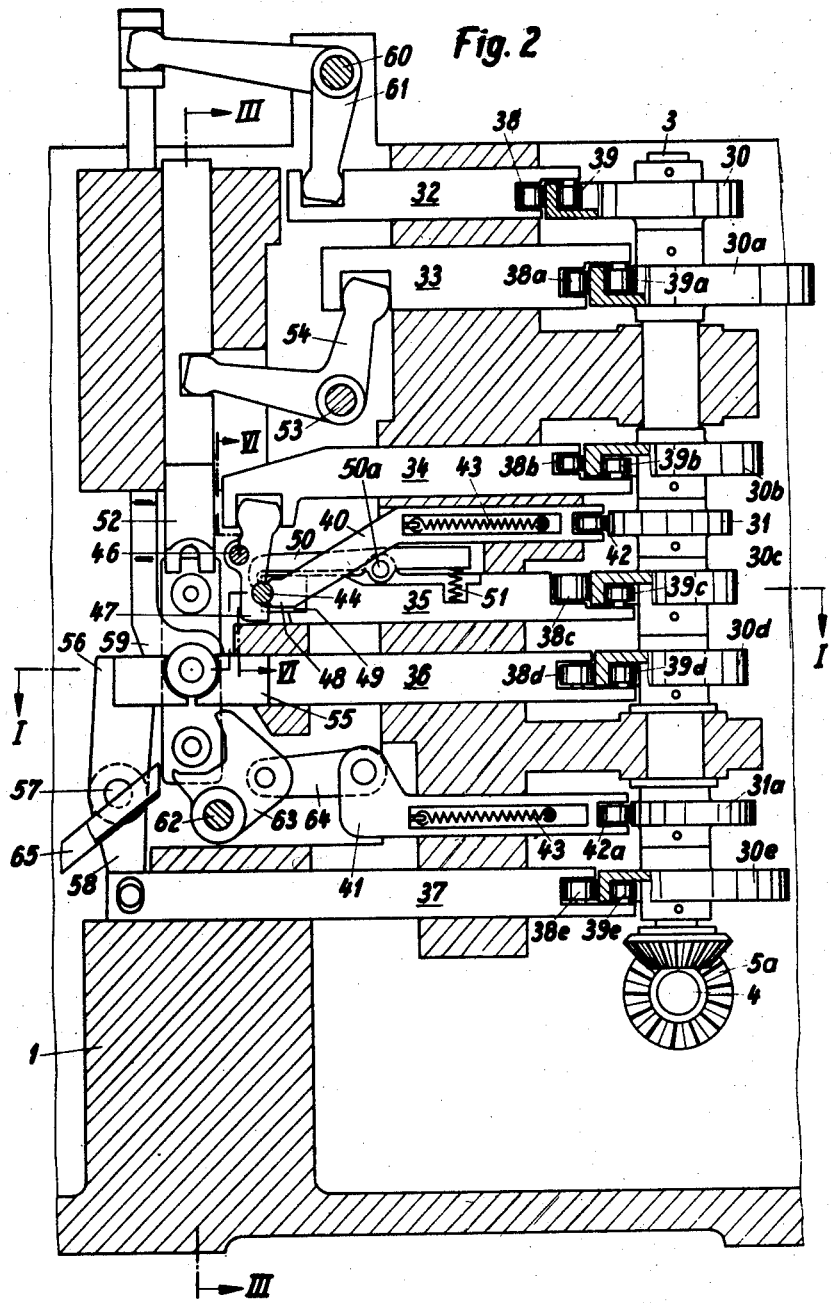

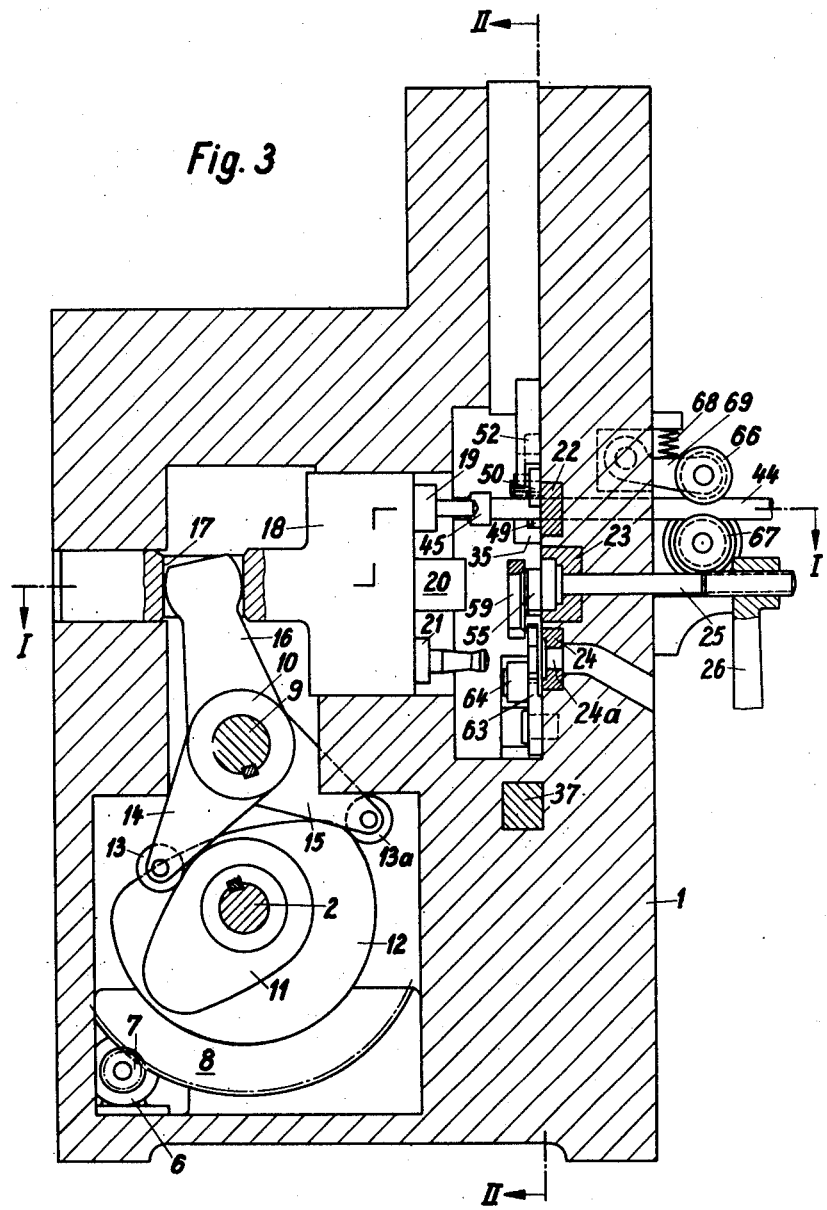

Sept. 29, 1964 R. ELSEN 3,150,438
MULTI-STEP PRESS
Filed Aug. 22, 1960 10 Sheets-Sheet 4
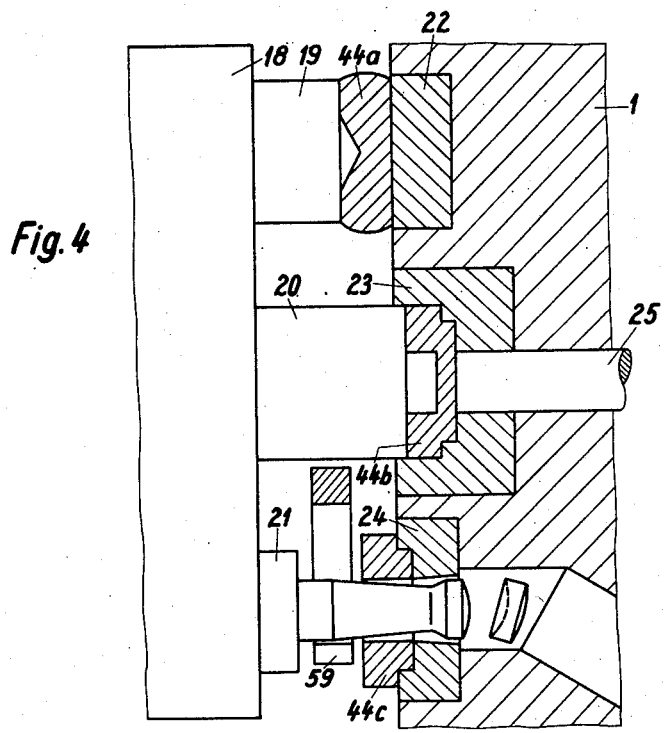
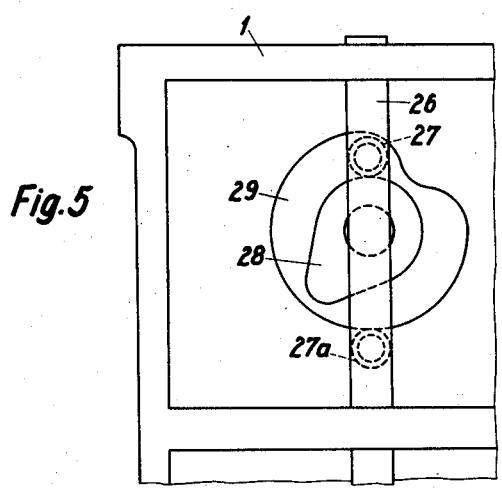
*Inventor:*
Reinhold Elsen

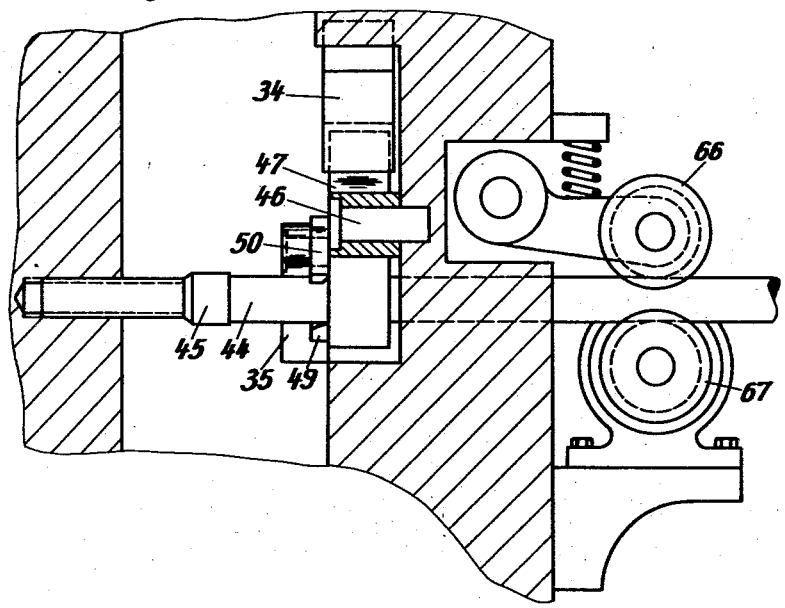
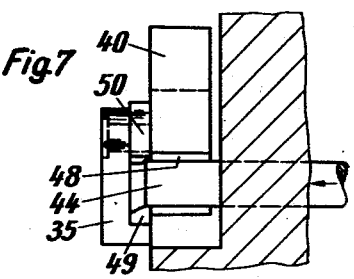

Sept. 29, 1964 R. ELSEN 3,150,438
MULTI-STEP PRESS
Filed Aug. 22, 1960 10 Sheets-Sheet 7

Inventor:
Reinhold Elsen
by

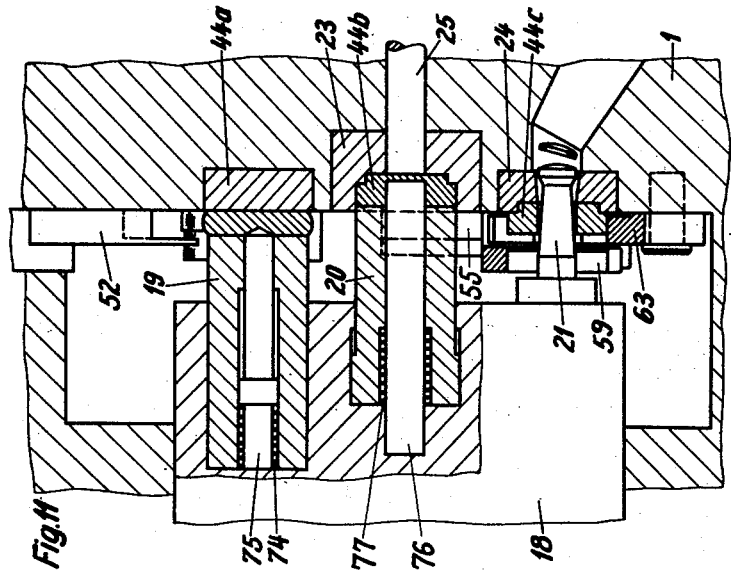
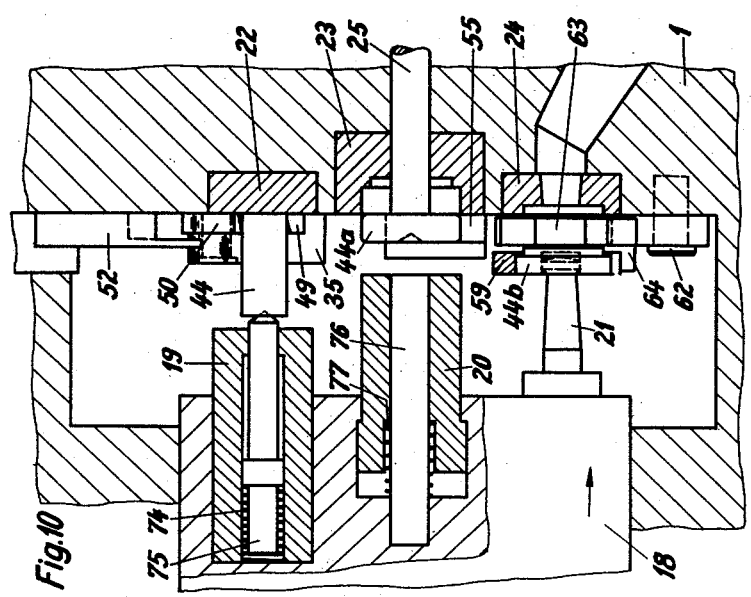

Sept. 29, 1964
R. ELSEN
3,150,438
MULTI-STEP PRESS
Filed Aug. 22, 1960
10 Sheets-Sheet 9
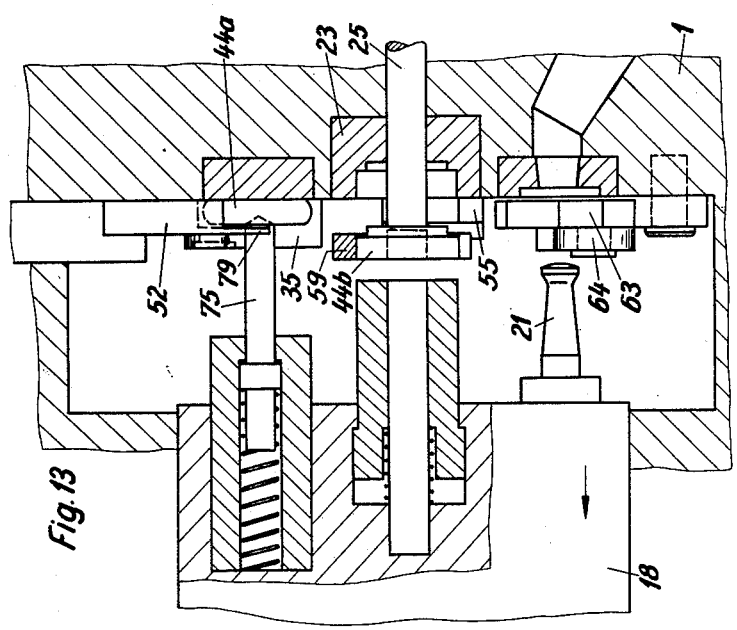
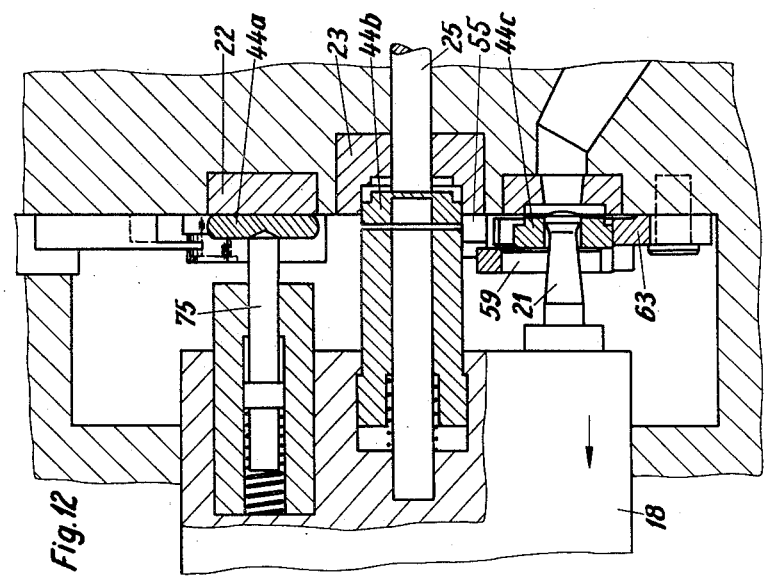
*Inventor:*
Reinhold Elsen
by

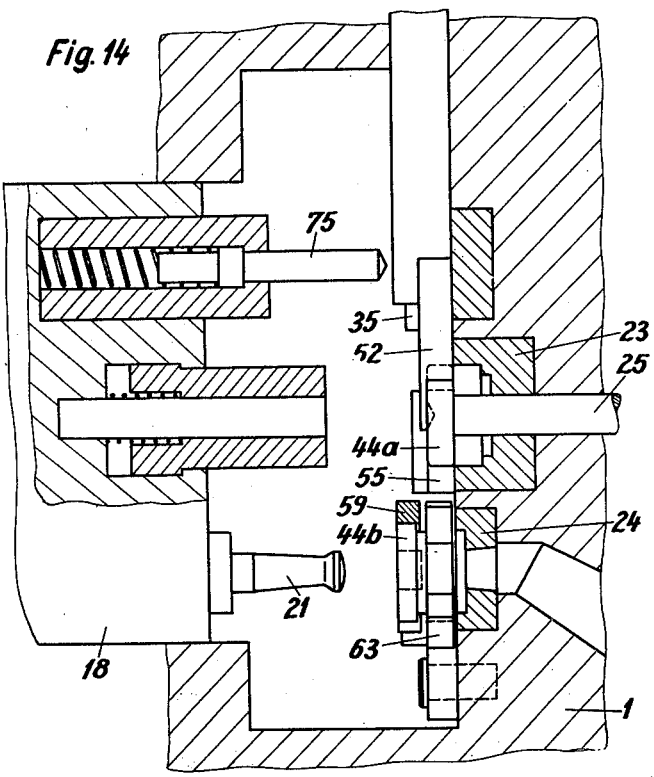

United States Patent Office 3,150,438
Patented Sept. 29, 1964

1

3,150,438
MULTI-STEP PRESS
Reinhold Elsen, 42 Pettenkoferstrasse, Essen, Germany
Filed Aug. 22, 1960, Ser. No. 50,931
Claims priority, application Germany Sept. 12, 1959
3 Claims. (Cl. 29—34)

The present invention relates to a multi-stage press for making definitely shaped metallic articles from bar or strip stock. More specifically, the present invention concerns a multi-stage press into which is fed the bar or strip stock in upsetting direction, and in which the stock is cut into sections which are fed step by step to various shaping tools for shaping the stock material into the desired article.

With heretofore known multi-stage presses, the cutting device, the individual transporting elements, and the shaping tools were actuated by a plurality of drive shafts which were driven by the main drive shaft and which were arranged around the entire machine block in order to be able to connect the drives with the individual tools. Such an arrangement, however, has made the heretofore known presses of the type involved rather complicated, difficult to control and rather bulky. A particular disadvantage of these heretofore known presses consists in that the tools arranged around the pressing punch and the drives therefor make it difficult to observe the shaping processes and cause considerable difficulties and require considerable time whenever it is necessary to exchange a tool.

It is, therefore, an object of the present invention to provide a multi-stage press of the general type mentioned above, which will overcome the above mentioned drawbacks.

It is another object of this invention to provide a multi-stage press for forming metallic articles from bar and strip stock material, in which the driving elements for the tools are greatly simplified over the driving elements of heretofore known presses of the type involved while the driving paths are reduced to a minimum.

It is another object of this invention to provide a multi-stage press of the type set forth in the preceding paragraph, in which the tools can be driven by carriages and pusher rods known per se which can easily and nevertheless precisely be manufactured, and in which the tools are located closely to the driving shafts while short drive connections are provided for the said carriages.

These and other objects and advantages of the invention will appear more clearly from the following specification in connection with the accompanying drawings, in which:

FIG. 2 is a vertical section taken along the line II—II of FIGS. 1 and 3.

FIG. 3 is a section taken along the line III—III of FIGS. 1 and 2.

FIG. 4 illustrates on a larger scale than that of FIGS. 1 to 3 a section through the upsetting tools.

FIG. 5 is a partial view as seen in the direction of the arrow V of FIG. 1.

FIGS. 6 to 14 illustrate on a larger scale than FIGS. 1 to 4 the various forming tools and show the same in successive working operations.

*General Arrangement*

Figure 1:
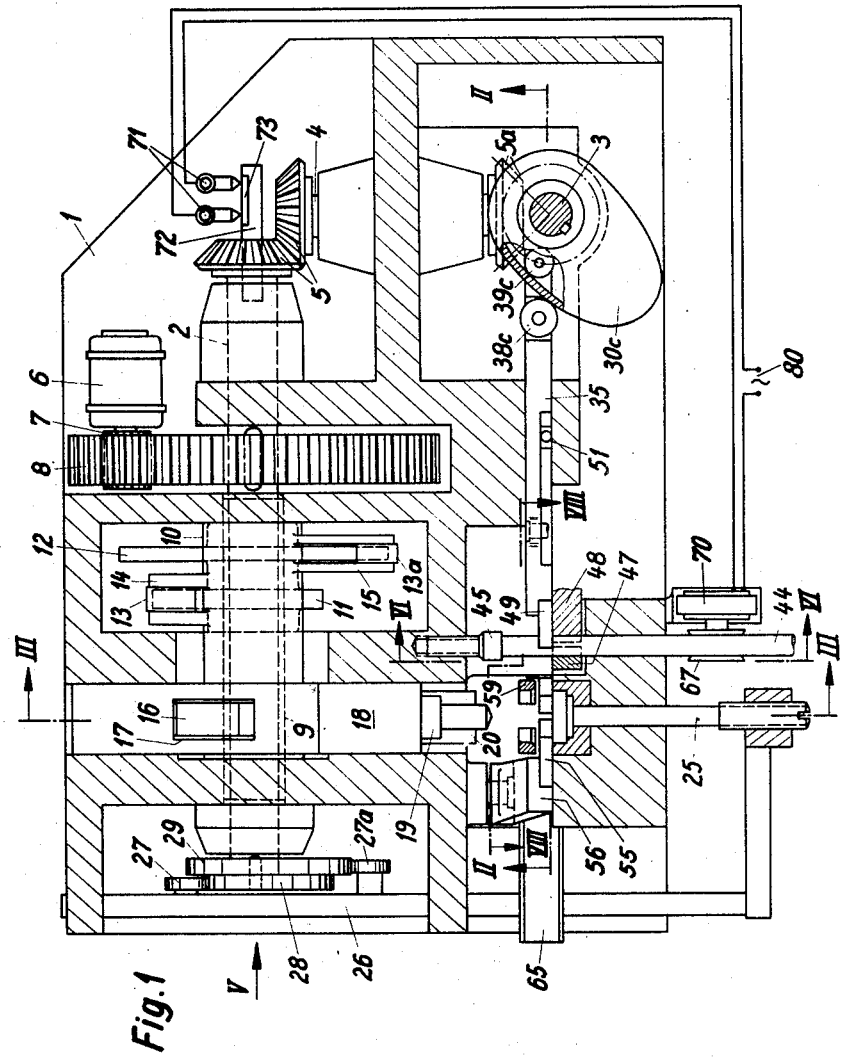
FIG. 1 represents a horizontal section through a press according to the present invention, said section being taken along the line I—I of FIGS. 2 and 3.

The above mentioned objects have been realized by the multi-stage press according to the present invention which is characterized primarily in that the tools of the cutting device and all additional shaping tools and conveying or transfer elements which are not directly driven by the main drive shaft are directly or indirectly driven by carriages which in their turn are driven by a single second auxiliary drive shaft extending at a right angle to the main drive shaft and being drivingly connected thereto; or by an intermediate shaft, while all of the carriages are arranged in one or in a plurality of planes parallel to each other and to said second auxiliary drive shaft. In this way, the individual tools and driving means therefor are arranged practically on one side of the tool carrier and are freely accessible from several sides so that they can be exchanged without any difficulties. The shaping operations during the individual upsetting steps can easily be observed. A further advantage of the press according to the present invention consists in its compactness and its short conveying paths for the articles to be shaped so that if a hot shaping method is employed, undue cooling of the article being processed will be reduced to a minimum.

It should furthermore be noted that with a press according to the present invention simple plane drive mechanisms can be employed for the carriages and tools which in turn allows an increase in the speed and output of the press.

*Structural Arrangement*

Referring now to the drawings in detail, the press shown therein comprises a housing 1 having journalled therein a horizontal main shaft 2 and a vertical second auxiliary drive shaft 3. As will be clearly evident from the drawings, the main shaft 2 and second auxiliary drive shaft 3 cross each other at a right angle and are drivingly connected to each other by an intermediate shaft 4 and pairs of bevel gears 5 and 5a. The press furthermore comprises an electric motor 6 driving a pinion 7 which meshes with a gear 8 keyed or otherwise fixedly connected to the main drive shaft 2.

The tools movable in the upsetting direction are adapted to be driven by the main shaft 2. To this end, main shaft 2 has fixedly connected thereto a cam 11 (FIG. 3) and also a counter cam 12. Cams 11 and 12 are adapted to oscillate a three-arm lever 10 which is keyed to a shaft 9. Arms 14 and 15 of the oscillating lever 10 respectively carry rollers 13 and 13a for rolling engagement with cams 11 and 12 respectively. Oscillating lever 10 is furthermore equipped with a hammer-shaped arm 16 which engages a recess 17 of a tool carrier 18 which is horizontally reciprocable in housing 1. In this way, lever 10 is adapted to reciprocate tool carrier 18. One end face of tool carrier 18 has mounted thereon three superimposed upsetting tools (FIG. 3) namely a pre-presser or upsetter 19, a finish presser or upsetter 20 and a hole puncher 21. Opposite said upsetters there are arranged in housing 1 a pre-upsetter plate 22 and a finish die 23 respectively, whereas opposite said hole puncher 21 there is provided a plate 24 with a bore 24a. An ejector 25 extends from the rear side into the die 23 and is connected with a shifter bar 26 (FIGS. 1 and 3) which is displaceably mounted in housing 1. Shifter bar 26 has rollers 27, 27a rotatably journalled thereon. These rollers are in roller engagement with cam discs 28 and 29 respectively which are keyed to main shaft 2 and are adapted through the intervention of said rollers 27, 27a and said shifter bar 26 to reciprocate said ejector 25.

The second drive shaft 3 is adapted to drive all tools which move in a direction perpendicular to the upsetting direction. This drive is effected either directly or indirectly through carriages which are displaceable substantially in a single plane parallel to shaft 3. The drive is effected by cam discs keyed to shaft 3. These cam discs are designed as double faced cam discs 30, 30a, 30b, 30c, 30d and 30e or as single faced cam discs 31 and 31a. The double faced cam discs automatically reciprocate the carriages 32, 33, 34, 35, 36, and 37 by means of rollers 38, 38a, 38b, 38c, 38d and 38e respectively and between counter rollers 39, 39a, 39b, 39c, 39d and 39e, said rollers being rotatably journalled on the respective carriages. The single faced cam discs 31 and 31a by means of rollers 42 and 42a actuate the carriages 40 and 41 which are provided with return springs 43 and 43a respectively for effecting the return movement of the carriages 40 and 41. The bar or strip material 44 (see FIGS. 1 and 3) is introduced in the machine from one side so as to engage an adjustable abutment 45. The thus introduced stock material is adapted to be held between a counter knife 47 rotatably journalled on a bolt 46 (FIG. 2), and by a pressing member 48 mounted on carriage 40. Said counter knife 47 is adapted to be oscillated by carriage 34. The press according to the invention furthermore comprises a shearing knife 49 (FIG. 1) which is mounted on carriage 35 and is adapted to cut off a section from the stock material 44 and to move or transfer the same to a position between the pre-upsetter 19 and the pre-upsetting plate 22. Rotatably journalled on pivot 50a of carriage 35 is a holder 50 adapted to be rotated against the thrust of a spring 51 for holding the cut-off stock section in the shearing knife 49 during the feeding into the pre-upsetting position. When the carriage 35 moves in rearward direction, holder 50 is stripped off from the stock section against the thrust of spring 51 while the latter is held fast between the pre-upsetter 19 and plate 22. During this pre-upsetting operation, the cut-off section is pre-pressed to a barrel-shaped blank 44a (see FIG. 4). By means of a gripper member 52 (FIG. 2) which is operable by the carriage 33 through an elbow lever 54 rotatably journalled on pivot 53, the blank 44a is adapted to be moved or transferred from its pre-upsetting position into the finish upsetting position located therebelow. At the same time, there may be actuated a right-hand gripper member 55 carried by slide 36, and a left-hand gripper member 56 mounted on a lever 58 rotatably supported by a pivot 57, said gripper member 56 being operable by carriage 37. The said gripper members 55 and 56 are movable toward each other so that the blank 44a will be grasped by the three gripper members 52, 55 and 56 and will be upset radially to a diameter which corresponds to the opening in the die 23. The finish upsetter 20 is adapted to move the blank into the die 23 for finish pressing the same to the blank 44b. The several elements which move or transfer the workpiece from position to position constitute transfer means movable between the tool holding carriage and the dies that cooperate with tools in the carriage.

After the finish upsetting operation has been completed, it will be ejected by the ejector 25 into a reciprocating carriage 59 (FIG. 2) adapted to be driven by carriage 32 through the intervention of a lever 61 journalled on a bolt 60. Carriage 59 is adapted to move the blank 44b between the hole puncher 21 and the plate 24 so that the puncher 21 can move the blank from carriage 59 onto plate 24 for punching a hole in said blank.

During its return stroke, the puncher 21 will take with it the finished article 44c to the partially returned carriage 59 which latter will then strip off the finished article from the further backwards moving puncher 21. The arrangement furthermore comprises a stripper 63 which is rotatably mounted on a pivot 62 and is adapted to be driven by carriage 41 through a member 64. It will thus be evident that stripper 63 will strip the finished article 44c off carriage 59 if the article should stick to said carriage, so that the article will drop into the transporting trough 65. The feeding of the bar or strip stock into the press is effected by two feeder rollers 66, 67 (FIG. 3) between which the material is passed. The upper one of the rollers 66, 67 which is carried by a lever 69, is by means of a spring 68 continuously urged toward the lower roller 67.

As will be evident from FIG. 1, the roller 67 is adapted to be driven by an electric motor 70 which is adapted to be connected to a current source 80 and to be electrically connected to two sliding contacts 71. The sliding contacts 71 are adapted to engage a rotating stud 72 which is fixedly connected to shaft 2 and consists of insulating material. Inserted into the cyclindrical outer surface of stud 72 is a current conducting contact strip 73. Strip 73 is adapted during rotation of shaft 2 to interconnect the sliding contacts 71 and thereby temporarily and for a short period to close the circuit comprising motor 70 so that the latter will drive roller 67 which will then feed the strip or bar stock into the shearing position.

*Operation*

Figure 8:
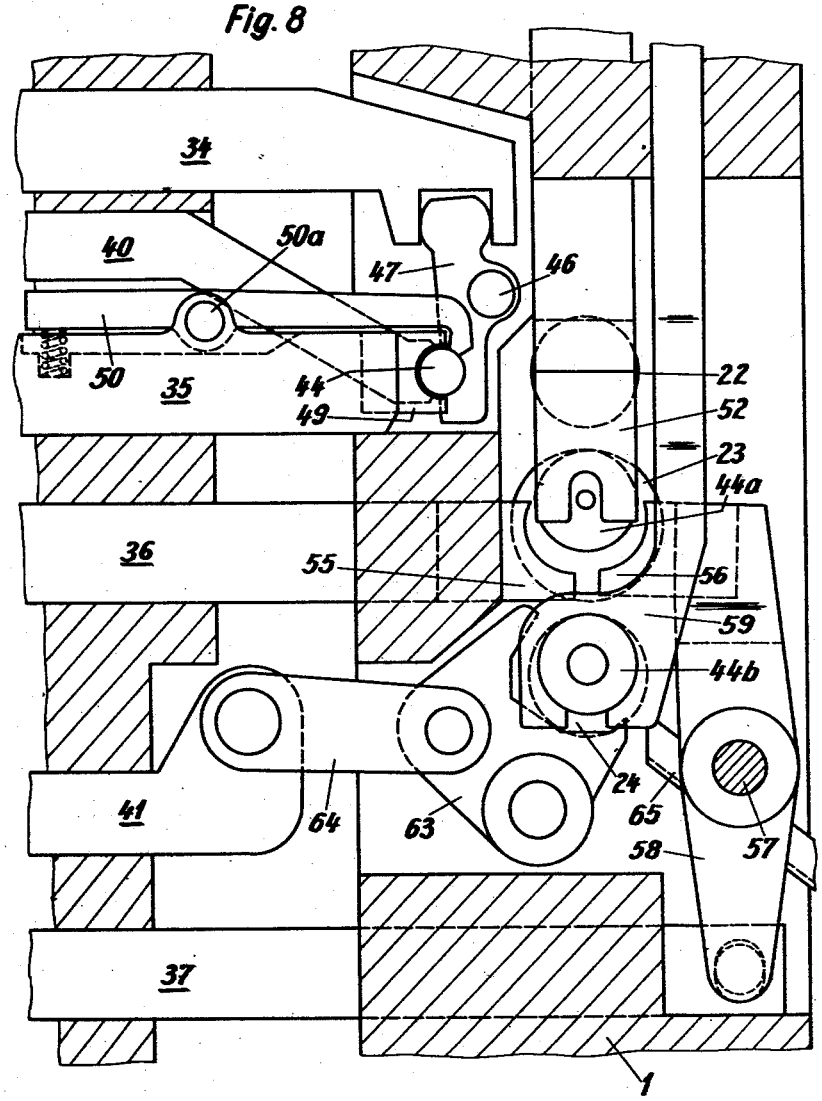
Figure 9:
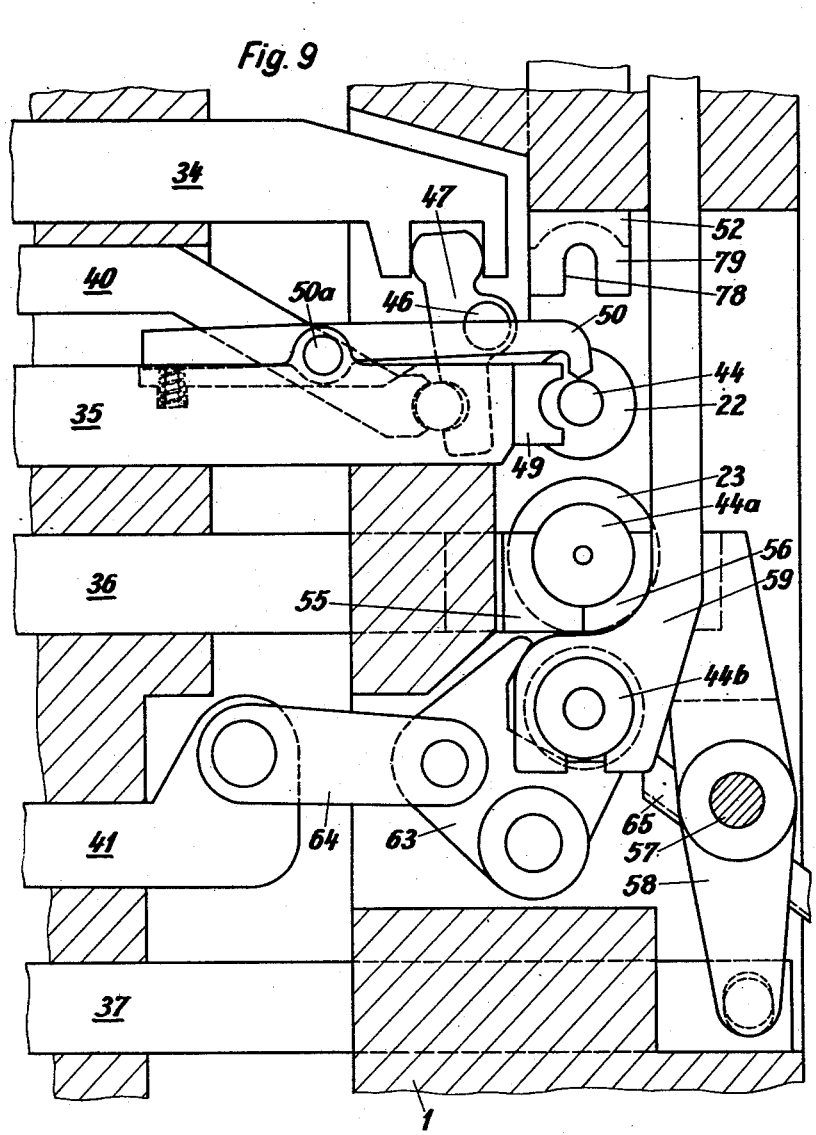

Motor 6 is switched on to rotate shafts 2, 3 and 4, shafts 3 and 2 rotating at the same speed. The tool carrier 18 moves back and forth once per each revolution of shaft 2. While the tool carrier 18 is in its rear dead center position, the contact strip 73 (FIG. 1) interconnects the sliding contacts 71 so that the motor 70 is switched on and the bar or strip stock 44 is fed by friction with roller 67 against the abutment 45. Cam discs 31 (FIG. 2) and 30b now move carriage 34 and 40 toward the left with regard to FIG. 2 so that the bar or strip stock will be clamped in between counter knife 47 and pressing member 48. When contact plate 73 has moved out of contact with the sliding contacts 71, motor 70 is switched off again. Cam disc 30c now moves slide 35 with shearing knife 49 against the stock material 44 while the resilient holder 50 catches over said stock material (FIG. 8). The shearing knife 49 is now advanced further and cuts off a section from the stock material and feeds the cut-off section to the plate 22. Holder 50 will hold the cut-off section in the semi-circular shearing surface of the shearing knife 49. Cam discs 11 and 12 will then move the tool carrier forward. The cut-off section will be held fast on plate 22 by mandrel 75 (FIG. 10) pressed against the cut-off section by a spring 74 so that cam disc 30c can again withdraw the shearing knife 49 while holder 50 will be stripped off from the cut-off section 44 (see FIG. 9). Cam disc 30b will then draw back slide 34 while spring 43 will draw back carriage 40 against the receding cam 31 so that the pressing member 48 and the counter knife 47 will be lifted off from the stock material.

FIG. 10 shows a cut-off section 44 in its pre-upsetting position, while a blank 44a carried by the clamping members 55 and 56 (FIG. 9) is in its finish upsetting position, and a blank 44b located in the carriage 59 occupies its hole punching station. The cam discs 11 and 12 further advance the tool carrier 18. During this operation, the hole puncher 21 moves into a depression of blank 44b which was previously formed at the finish upsetting station by mandrel 76 whereupon the blank 44b is moved out of the carriage 59 past the stripper 63 onto the plate 24. At the finish upsetting station, the blank 44a is clamped between the mandrel 76 and the ejector 25 while the finish upsetter 20 resiliently rests on blank 44a under the pressure of a spring 77.

As soon as the blank is held in this way, the cam discs 30d and 30e pull back the carriages 36 and 37 so that the holding members 55 and 56 will be lifted off somewhat from the blank 44a, and the finish upsetter 20 will be able to move between them. Cam discs 28 and 29 (FIG. 1) now move back the ejector 25 to the same extent as the mandrel 76 advances so that the blank 44a will be passed beyond members 55 and 56 into the die 23. When the various parts occupy the position shown in FIG. 11, the pre-upsetting, finish upsetting and the punching operations are completed.

Before cam discs 11 and 12 withdraw the tool carrier 18, cam disc 30 (FIG. 2) moves carriage 32 somewhat toward the left so that the carriage 59 will be moved somewhat upwardly and the blank 44c due to the friction of the puncher 21 in the hole of the blank cannot be pulled back any longer by the puncher 21 into carriage 59. Instead the blank 44c will be stripped off from the puncher 21 when the return stroke of the tool carrier 18 will now start (FIG. 12). The cam discs 28 and 29 start again to move the ejector 25 forwardly which will press the article 44b out of the die 23 onto the holding members 55 and 56. The blank 44a will still be held by mandrel 75. As soon as the puncher 21 has left the article 44c, cam 31a moves carriage 41 toward the left (FIG. 2) so that the article 44c will be ejected by the stripper 63 onto the trough 65, whereupon spring 43 will pull carriage 41 immediately again against the receding cam 31a. As soon as the finish upsetter 20 has moved back to such an extent that carriage 59 can again move upwardly (FIG. 13), cam disc 30 will move carriage 32 further toward the left until carriage 59 occupies a position in front of die 23. The cam discs 28 and 29 will now move the ejector 25 forwardly so that blank 44b will be moved beyond the holders 55 and 56 into carriage 59 (FIG. 13) which latter will then move immediately downwardly in front of plate 24 due to the fact that cam disc 30 will draw carriage 32 toward the right with regard to FIG. 2.

Furthermore, cam discs 28 and 29 move ejector 25 back into the position shown in FIG. 10. In the meantime, cam discs 11 and 12 have returned tool carrier 18 further while the mandrel 75 has still held fast the blank 44a. Cam disc 30a now moves carriage 33 toward the left with regard to FIG. 2 so that the holder 52 moves downwardly and by means of its tongue 79 provided with a recess 78 catches over blank 44a (FIG. 13). Mandrel 75 will then be lifted off from the blank 44a during the continuing return stroke of tool carrier 18, and the member 52 will move blank 44a downwardly to the members 55 and 56 (FIG. 14). Thereupon, cam discs 30d and 30e will move the carriages 36 and 37 toward the left with regard to FIG. 2 so that blank 44a will now be upset radially between the holders 52, 55 and 56 pressed against blank 44a so that it will fit into die 23. Cam disc 30e subsequently and immediately will draw carriage 33 toward the right with regard to FIG. 2 and will move member 52 upwardly. Shafts 2 and 3 have now completed a complete revolution so that motor 70 will against be switched on by contact of strip 73 with the contact slides 71, and a new cycle will start.

It is, of course, to be understood that the present invention is, by no means, limited to the particular construction shown in the drawings but also comprises any modifications within the scope of the appended claims.

What I claim is:

1. A multi-stage press for making articles from bar or strip stock, which comprises in combination: a frame having a working space therein accessible from lateral openings in the press frame, cutting means in said frame, feeding means for feeding bar or strip stock endwise to said cutting means to cut off a workpiece from said stock, a press carriage reciprocable in said frame on one side of said working space provided with vertically superimposed tool holding means for receiving and holding upsetting and forming tools, a horizontal main drive shaft in said frame drivingly connected to said carriage for reciprocating the same, a set of vertically superimosed die means in said frame on the other side of said working space and aligned with said tools in said superimposed tool holding means for cooperation therewith, transfer means in said frame movable in a direction transverse to the direction of movement of said carriage and in said work space between said carriage and said set of die means for receiving a cutoff workpiece from said cutting means and for transferring said workpiece to one of said die means and successively to the other die means, a vertical auxiliary drive shaft in said frame drivingly connected to said main drive shaft and arranged laterally of the vertical plane passing through the path of movement of said carriage and spaced from one of said lateral openings, and superimposed cam means drivingly connected to said auxiliary drive shaft for controlling said cutting means and said transfer means.

2. A multi-stage press for making articles from bar or strip stock, which comprises in combination: a frame having a working space therein accessible from lateral openings in the press frame, cutting means in said frame, feeding means for feeding bar or strip stock horizontally in the direction of the length thereof to said cutting means to cut off a workpiece from said stock, a press carriage displaceable in said direction in said frame and provided with vertically superimposed upsetting and forming tools on one side of said working space, a horizontal main drive shaft in said frame drivingly connected to said carriage for actuating the same, a set of vertically superimposed die means in said frame on the opposite side of said working space and aligned with said superimposed tools for cooperation therewith, a plurality of transfer means and transverse deforming tools in said frame movable in a direction transverse to the direction of movement of said carriage in said working space and between said carriage and said set of die means for respectively transferring said workpiece in vertical direction at right angles to said aforementioned direction to one of said die means and successively to the other die means and effecting at least one deformation of the workpiece in said second direction, a vertical auxiliary drive shaft in said frame drivingly connected to said main drive shaft spaced from one of said lateral openings and arranged laterally of the vertical plane passing through the path for movement of said carriage, and superimposed cam means drivingly connected to said auxiliary drive shaft for controlling said cutting means and said transfer means and said transverse deforming tools.

3. A multi-stage press for making articles from bar or strip stock fed in a first horizontal direction in the direction of the length of the stock; a frame having a working space therein accessible from lateral openings in the press frame, cutting means in said frame, feeding means for feeding bar or strip stock in said first direction to said cutting means to cut off a workpiece from said stock, a press carriage displaceable in said one direction in said frame and provided with vertically superimposed upsetting and forming tools on one side of said working space, a horizontal main drive shaft in said frame drivingly connected to said carriage for actuating the same, a set of superimposed die means in said frame on the opposite side of said working space and aligned with said superimposed tools for cooperation therewith, a plurality of transfer means and transverse deforming tools in said frame movable in a direction transverse to the direction of movement of said carriage in said working space and between said carriage and said set of die means for respectively transferring said workpiece in a second direction transverse to said one direction from said cutting means to one of said die means and successively to the other die means and effecting at least one deformable of the workpiece in a direction transverse to the direction of movement of said carriage, a vertical auxiliary drive shaft drivingly connected to said main drive shaft and arranged laterally of the plane passing through the path of movement of said carriage and also arranged laterally of one of said lateral openings, superimposed cam means drivingly connected to said auxiliary drive shaft, and a plurality of slide means in said frame respectively operable by said cam means and arranged in planes parallel to said main and auxiliary drive shafts for controlling said cutting means and also said transfer means and said transverse deforming tools.

(References on following page)

References Cited in the file of this patent

UNITED STATES PATENTS

| | | |
|---|---|---|
| 846,393 | Buckley | Mar. 5, 1927 |
| 1,733,263 | Hoopes | Oct. 29, 1929 |
| 1,840,389 | Eubank | Jan. 12, 1932 |
| 2,074,679 | Wilcox | Mar. 23, 1937 |
| 2,074,680 | Wilcox | Mar. 23, 1937 |
| 2,639,632 | Criley | May 26, 1953 |
| 2,814,812 | Stern | Dec. 3, 1957 |

FOREIGN PATENTS

| | | |
|---|---|---|
| 21,440 | Great Britain | 1913 |
| 556,634 | Belgium | Oct. 12, 1957 |